Jan. 23, 1923.
B. C. ROCKWELL.
COLLAPSIBLE CRATE.
FILED JULY 14, 1921.
1,443,147.
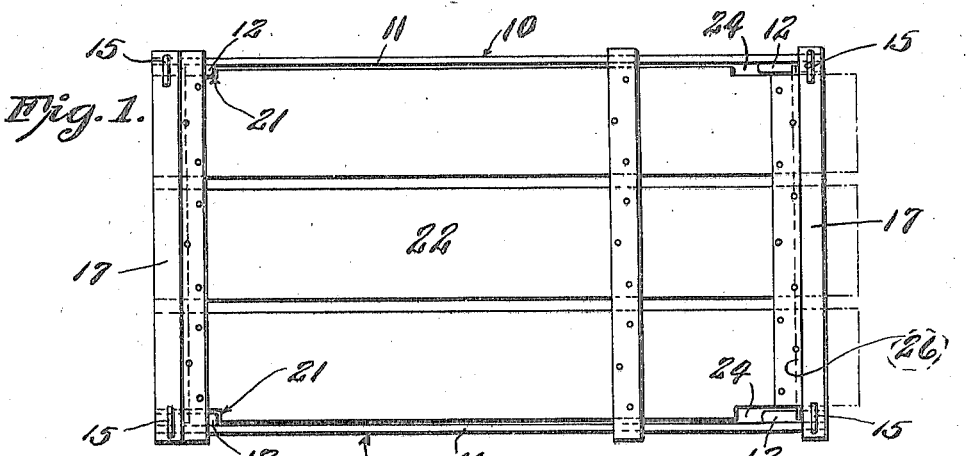
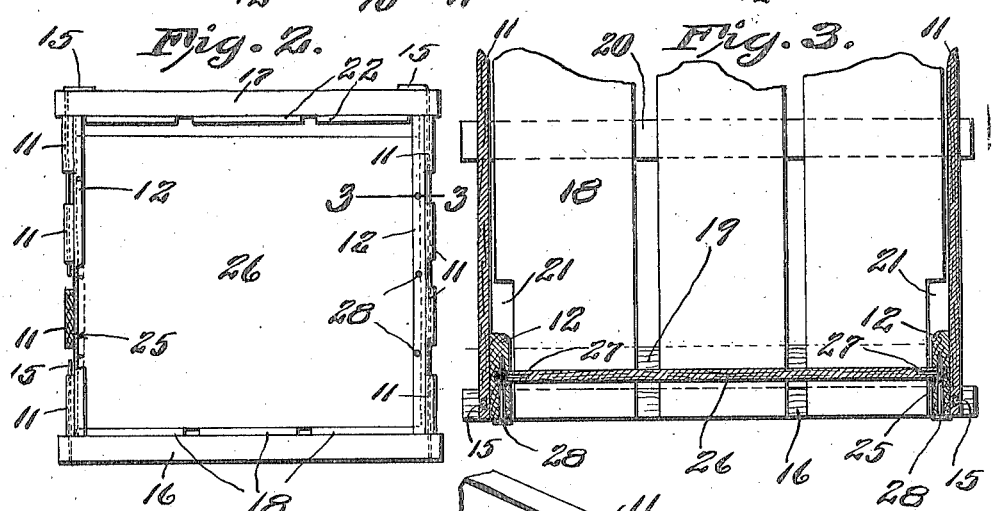
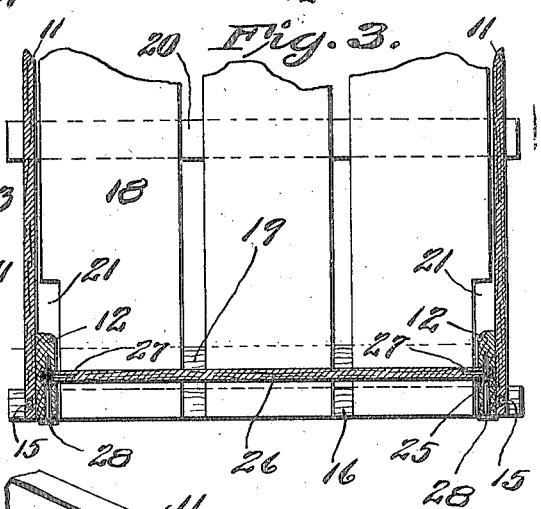
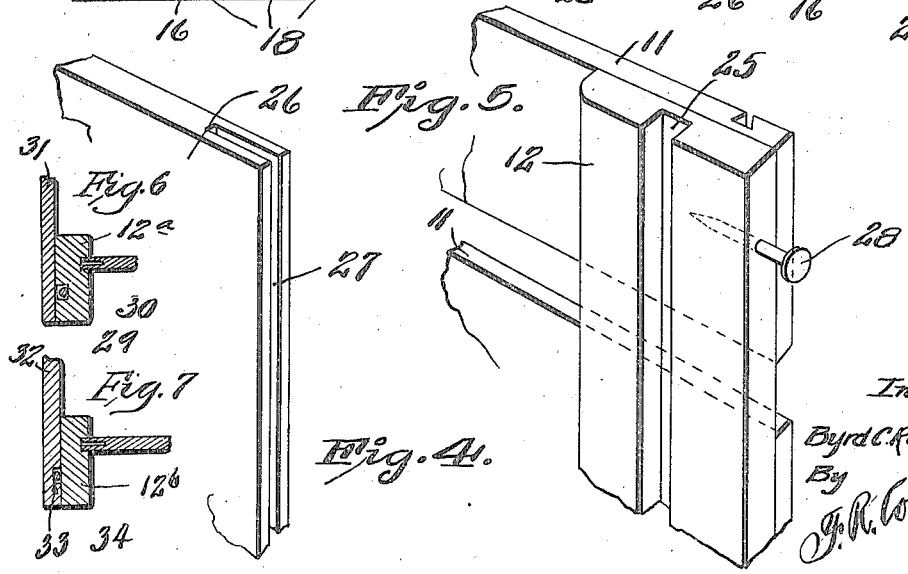
Inventor
Byrd C. Rockwell.
By J. R. Cornwall
Atty.

Patented Jan. 23, 1923.

1,443,147

UNITED STATES PATENT OFFICE.

BYRD C. ROCKWELL, OF CAMDEN, ARKANSAS.

COLLAPSIBLE CRATE.

Application filed July 14, 1921. Serial No. 484,680.

*To all whom it may concern:*

Be it known that I, BYRD C. ROCKWELL, a citizen of the United States, residing at Camden, county of Ouachita, and State of Arkansas, have invented a certain new and useful Improvement in Collapsible Crates, of which the following is a full, clear and exact description, such as will enable others skilled in the art to which it appertains to make and use the same, reference being had to the accompanying drawings, forming part of this application.

My invention relates generally to collapsible crates, and more particularly to crates designed for storing and shipping sweet potatoes and similar crops.

The objects of the invention are to provide a crate which is of durable construction so that it can be used in hauling the crop from the field, and which is so constructed that it can be used during the curing process and for the storage of the crop so that the necessity of transferring the contents from a field crate to a curing or storage crate is eliminated, thereby effecting a considerable saving of time and labor and preventing injury to the crop due to carelessness in handling during transferring operations.

Another object of my invention is to provide a crate which is of knock-down construction and can be readily assembled without the use of special tools and is of light and strong construction so that it can be used for shipping purposes, after the sweet potatoes contained therein have been properly cured.

Further objects of the invention are to provide a crate of the class described and having detachable end walls which can be easily and quickly placed in position, and which end walls are adapted to engage the seats formed on the side walls of the crate without sticking or warping.

With the foregoing and other objects in view, my invention consists in certain novel features of construction and arrangements of parts hereinafter more fully described and claimed, and illustrated in the accompanying drawings, in which—

Figure 1 is a plan view of my improved crate.

Figure 2 is an end view of the same with portions broken away to more clearly illustrate the construction.

Figure 3 is a horizontal cross-section taken on the line 3—3 of Figure 2.

Figure 4 is a perspective detail view of a portion of the end wall.

Figure 5 is a perspective detail view of a portion of the side wall of the crate.

Figure 6 is a horizontal cross-section through a modified form of crate.

Figure 7 is a horizontal cross-section of another modification.

Referring by numerals to the accompanying drawings, 10 designates the side walls of a crate, which side walls consist of longitudinally disposed slats 11 spaced from each other and having their ends secured to transversely disposed corner posts 12. Adjacent to the end of each slat 11 and in the outer faces thereof are undercut or dovetailed transverse grooves 14 which are designed to receive wire members 15, the lower ends of which are seated in the ends of the bottom end pieces 16, while the upper ends of said wire members are threaded through apertures formed in the ends of top end pieces 17. The upper ends of wire members 15 which project outwardly from the top end pieces 17 are bent against said top end pieces so that wire members 15 pivotally hold said side walls 10 and end pieces 16 and 17 in assembled relation.

The removable bottom wall 18 is placed in position on the crate in the usual manner by placing one end of said bottom wall within the crate immediately under one of the end pieces 16 and then moving said bottom wall longitudinally in one direction until the opposite end of said bottom wall is clear of its corresponding end piece 16. Whereupon, said end of the bottom wall is pressed inwardly and the bottom wall 18 then moved longitudinally in an opposite direction so that both ends thereof are disposed inwardly of and bear against end bars 16. When in this position, bottom wall 18 is held against longitudinal movement by its transverse members 19 which project outwardly from said bottom wall and abut the inner sides of end bars 16. and is held against inward movement by intermediate transverse bar 20, the ends of which project outwardly and rest against the outer edges of side walls 10. The corners of the bottom wall 18 are notched or cut out as indicated at 21 in order to provide clearance between bottom wall 18 and the lower ends of corner posts 12 when moving said bottom wall longitudinally.

The cover or top wall 22 is of the same construction as the bottom wall 18 and is placed in position in a similar manner, the said cover 22 being provided with corner notches 24 to provide clearance between the ends of cover 22 and the upper ends of posts 12. Notches 21 formed in one end of the bottom wall 18 and notches 24 formed in one end of cover 22 are of sufficient length to permit the initial longitudinal movement of said bottom wall 18 and cover 22.

The inner sides of corner posts 12 are provided with longitudinally disposed grooves 25 which are adapted to receive the side edges of end walls 26. These grooves, which are open at their ends, are offset inwardly with respect to the top end pieces 17 so that the latter will not interfere with the vertical movement of the end walls 26 when the same are slid into their respective positions on the crate. In order to provide an easy working fit, between grooves 25 and the side edges of end walls 26, and prevent warping or sticking of said end walls, said side edges are preferably grooved or rabbeted, as indicated at 27. The inner sides of the posts 12 are provided with nails 28 which are partially driven into the corner posts at the factory. These nails when driven home after the end walls 26 have been placed in position, will engage the edges thereof and hold the end walls against displacement.

In Figure 6, the corner post 12$^a$ is provided in its outer face with a longitudinally disposed groove 29 in which is seated wire member 30. Side walls 31, the ends of which are secured to corner posts 12$^a$, prevent lateral displacement of wire 30. In Figure 7, the inner side of a side wall 32 is provided with a transversely disposed groove 33, through which is threaded a wire member 34. Corner post 12$^b$ is secured to the inner side of side wall 32 and holds wire 34 in position in groove 33. End walls 26 provide rigid wall members which when placed in position on the crate reinforce said crate so that it can be successively used in the field for harvesting the crop and provide a knock-down crate which when assembled is of light weight and durable construction so as to make it practicable for shipping purposes.

Obviously, various changes in the form and construction of my improved crate can be made and substituted for those herein described and shown without departing from the spirit of my invention.

What I claim is:

1. A crate comprising side walls, provided with vertically disposed seats, transverse end bars hingedly connected near their free ends to said side walls and detachable end walls, the side edges of which are adapted to engage the vertically disposed seats of said side walls.

2. A crate comprising side walls, spacing end bars pivotally connected to said side walls, corner posts secured to the side walls, removable top and bottom walls, and detachable end walls, the side edges of which are adapted to form interengaging relation with said corner posts.

3. A crate comprising side walls, corner posts secured to said side walls and provided with longitudinally disposed grooves, end walls adapted to have their side edges seated in the grooves of said corner posts, and means in said corner posts adapted to enter said grooves and engage the side edges of the end walls thereby securing said end walls in position.

4. A crate comprising side walls provided near their ends with transverse seats, top and bottom end bars, wire members pivotally connecting the ends of said side walls with the corresponding ends of said transverse top and bottom bars, removable top and bottom walls and end walls adapted to have their edges engage the transverse seats of said side walls.

5. A crate comprising side walls, corner posts fixed to said side walls and provided in their inner faces with longitudinally disposed grooves, end walls the side edges of which are adapted to slidably engage said grooves, transversely disposed top and bottom end bars, wire members pivotally connecting the ends of said side walls with the corresponding ends of said top and bottom end bars, and removable top and bottom walls portions of which are cut away to provide clearance between the ends thereof and the ends of said corner posts.

6. A crate comprising side walls, corner posts fixed to said side walls and provided on their inner faces with longitudinally disposed grooves, end walls the side edges of which are adapted to slidably engage said grooves, transversely disposed top and bottom end bars, wire members pivotally connecting the ends of said side walls with the corresponding ends of said top and bottom end bars, removable top and bottom walls portions of which are cut away to provide clearance between the ends thereof and the ends of said corner posts, and fastening means partially driven into said corner posts and adapted when driven home to engage the edges of said end walls and hold the latter against movement.

7. A crate comprising side walls, corner posts secured to said side walls and provided on their inner faces with vertically disposed grooves, end walls having the side edges adapted to be seated in said grooves, said side edges being provided with longitudinally disposed grooves thereby providing a yielding engagement between said corner posts and said end walls, top and bottom end bars, wire members seated in the ends of said side walls and said top and bottom end bars, and removable top and bottom walls.

8. A crate comprising side walls, corner posts fixed to said side walls and provided on their outer faces with longitudinally disposed grooves, top and bottom transverse end bars, wire members seated in the longitudinal grooves of said corner posts and having their ends engaging the ends of said top and bottom end bars, removable top and bottom walls, and end walls having their side edges adapted to engage seats longitudinally disposed in the inner faces of said corner posts.

In testimony whereof I hereunto affix my signature this 9th day of July, 1921.

BYRD C. ROCKWELL.